US011185889B2

(12) United States Patent
Carrasco (10) Patent No.: US 11,185,889 B2
(45) Date of Patent: Nov. 30, 2021

(54) SIEVING DEVICE AND OPERATING METHOD

(71) Applicant: A O IDEAS GMBH, Schocherswil (CH)

(72) Inventor: César Carrasco, Schocherswil (CH)

(73) Assignee: A O IDEAS GMBH, Schocherswil (CH)

( * ) Notice: Subject to any disclaimer, the term of this patent is extended or adjusted under 35 U.S.C. 154(b) by 113 days.

(21) Appl. No.: 16/609,724

(22) PCT Filed: May 27, 2018

(86) PCT No.: PCT/EP2018/063859
§ 371 (c)(1),
(2) Date: Oct. 30, 2019

(87) PCT Pub. No.: WO2018/219840
PCT Pub. Date: Dec. 6, 2018

(65) Prior Publication Data
US 2020/0061673 A1 Feb. 27, 2020

(30) Foreign Application Priority Data

May 29, 2017 (EP) .................................... 17173326

(51) Int. Cl.
*B07B 1/42* (2006.01)
*B07B 1/46* (2006.01)

(52) U.S. Cl.
CPC .............. *B07B 1/42* (2013.01); *B07B 1/4609* (2013.01); *B07B 2201/04* (2013.01)

(58) Field of Classification Search
CPC ...... B07B 1/42; B07B 1/4609; B07B 2201/04

USPC .................................................. 209/233, 364
See application file for complete search history.

(56) References Cited

U.S. PATENT DOCUMENTS

| 4,082,657 A * | 4/1978 | Gage ........................ B03B 4/02 |
| | | 209/311 |
| 4,225,093 A * | 9/1980 | Rusch ...................... B02C 4/06 |
| | | 241/159 |
| 2005/0282601 A1* | 12/2005 | Duquesne ............. A01F 12/448 |
| | | 460/101 |

(Continued)

FOREIGN PATENT DOCUMENTS

| CN | 212069445 U | * 12/2020 |
| DE | 20 2005 005 847 U1 | 6/2005 |

(Continued)

OTHER PUBLICATIONS

Sep. 3, 2018 International Search Report issued in International Patent Application No. PCT/EP2018/063859.

*Primary Examiner* — Terrell H Matthews
(74) *Attorney, Agent, or Firm* — Oliff PLC (57) ABSTRACT

The sieving device includes a support device, which holds a sieve, which has at least one sieve lining that is held by a sieve frame, which is connected to a drive device. The drive device, which is controllable by a control device by means of a control program, includes at least three actuators, which are connected each on one side via a first swivel joint to the support device and which are connected each on another side via second swivel joint to the sieve frame, so that the sieve is held solely by the actuators and is displaceable within an operating volume and optionally rotatable.

12 Claims, 6 Drawing Sheets

(56) References Cited

U.S. PATENT DOCUMENTS

2006/0243643 A1* 11/2006 Scott .................... B07B 1/4663
                                                                         209/309

FOREIGN PATENT DOCUMENTS

| EP | 0 943 374 A2 | 9/1999 |
| GB | 1 350 941 A | 4/1974 |
| GB | 2 082 090 A | 3/1982 |
| WO | 94/10665 A1 | 5/1994 |
| WO | 2014/077685 A1 | 5/2014 |

* cited by examiner

SIEVING DEVICE AND OPERATING METHOD

The invention relates to a sieving device with a support device, by which a sieve is held, and an operating method for that sieving device.

Sieving devices, which serve for dividing a bulk material, e.g. a solid mixture, into fractions with different grain sizes, are used for example in the raw material processing industry, the food industry, the chemical industry and the building materials industry.

According to https://en.wikipedia.org/wiki/Sieve, a sieving device comprises a sieve lining which, as a separating medium, contains a large number of openings of the same size. The sieve lining consists either of metal (perforated sheet metal, wire mesh, metal mesh or metal rods), plastic, rubber of various hardnesses or silk gauze. The size of the openings is called the mesh size and defines the sieve section. Larger grains remain above the openings (sieve overflow); smaller grains fall down (sieve passage). A grain that is about the same size as the mesh size is called grain of critical size. A sieve can consist of one or more sieve linings lying on top of each other, with the sieve lining with the largest mesh size at the top of the sieve stack. The cleanliness of the sieve lining is important for the efficiency of a sieve. In particular, the blockage of the sieve openings by grain of critical size must be avoided by suitable measures (e.g. brushes, balls, chains, rubber cubes), which "run" on or under the sieve or by increasing the hole diameter downwards, as in the case of conically or double cylindrical drilled holes).

In large-scale applications, sieve linings are excited to certain movements by a drive to improve the sieving performance. The movement of the sieve lining serves for the further transport of the feed material in the longitudinal direction of the sieve, the ejection of grain of critical size from the mesh openings and the sustainability of the separation (sieving efficiency).

Known are tumbler sieving machines (see e.g. EP0943374A2), which have a sieving structure, that can be brought into a tumbling motion (throwing and vibrating motion), a supporting device elastically supporting the sieving structure and a drive shaft rotatably driven by an electric motor, which drives a pin, which is adjustable in inclination and eccentricity and on which the sieving structure is mounted. The sieve lining is thus set in a predetermined and always the same motion by the drive shaft and the tilting pin.

From DE202005005847U1 a sieving device is known, which has a sieve lining arranged in a sieve frame, which is coupled with an ultrasonic transducer. During operation, the sieve lining is inclined relative to the horizontal. Due to this inclination, the sieved product automatically flows over the sieve lining against the lowest point of the sieve lining during the sieving process. Fine grain is sieved through the meshes of the sieve lining. Coarse grain or dirt, on the other hand, gets into an edge area of the sieve lining and can be removed.

With these sieving devices, in which the sieve linings are aligned or moved in a predetermined manner, very good results are achieved on average. Nevertheless, it would be desirable if the working processes could be further improved. With regard to the large flow rates, even minor improvements can lead to significant cost savings.

The present invention is therefore based on the object of creating an improved sieving device and an operating method for this improved sieving device.

In particular, a sieving device and an operating device for this sieving device shall be created, which allow an increased material throughput as well as the removal of coarse grain, dirt and grain of critical size from the sieve meshes or sieve openings more quickly and easily.

It shall be possible to implement the inventive device in any configuration, as usually required or desired at the respective place of use. The sieving device should also be applicable in any industrial sector for sieving of any sieved product.

The sieving device shall have a simple structure and shall be maintained with little effort. In parallel to increasing the efficiency of the sieving device, the energy requirement shall be reduced.

The sieving device shall be compact and shall require little space, so that it can be advantageously integrated into any working or production process.

This task is solved with a sieving device and an operating method, which have the features given in claims 1 and 12 respectively. Advantageous embodiments of the invention are defined in further claims.

The sieving device comprises a support device, which holds a sieve, which has at least one sieve lining that is held by a sieve frame, which is connected to a drive device.

According to the invention, the drive device, which is controllable by a control device by means of a control program, comprises at least three actuators, which are connected each on one side via a first swivel joint to the support device and which are connected each on another side via second swivel joint to the sieve frame, so that the sieve is held solely by the actuators and is displaceable within an operating volume and is optionally rotatable.

Hence, the inventive sieving device allows moving the sieve either with predetermined motion sequences or with motion sequences that are defined as required and adapted to the current needs.

With periodic movements, especially harmonic movements, the sieved product remains after a certain time at a certain place, for example over a wire mesh of the sieve lining. This is especially the case with nano-powders or powders with a strong electromagnetic charge. The flow is thus limited without optimization being possible.

Whereas on average good results are achieved with given motion sequences, the invention now allows to optimize the motion sequences as required and to adapt them to the given conditions.

Thereby, various parameters can be considered in the control algorithms, such as the weight, the shape, the size, the structure, the humidity and/or the temperature of the grain or sieved product. Furthermore, the properties of the sieve lining, such as its flow area and mesh properties are preferably taken into account. The room temperature and humidity are also preferably taken into account.

The consideration of the mentioned parameters is particularly advantageous, because within a sieving process the general conditions and/or the properties of the sieved product can change abruptly or continuously. For example, the humidity and temperature of the sieved product or the environment can change. Furthermore, irregularities may occur in the supply of the sieved product. Furthermore, a larger part of grain of critical size may occur by chance, which may affect the permeability of the sieve lining at certain points or regions.

For correcting such disturbances a maintenance cycle can be periodically inserted, during which the sieve lining is freed from grain of critical size. For this purpose, the sieve lining can be moved to a maintenance position, in which, for example, a maintenance tool is guided along the underside of the sieve lining.

Metal rods, metal blades, brushes, balls, chains, rubber cubes can be used as maintenance tools or maintenance elements, which run above or under the sieve lining and which are preferably connected to a drive.

Deviations from the normal sieving process occur particularly at the beginning and end of the sieving process. In these process phases it is particularly important that the sieved product is evenly distributed. This in turn can be advantageously achieved by shifting the sieve along its longitudinal axis and transverse axis. At the beginning of the sieving process, relatively fast axial movements are advantageous, with which the sieved product is rapidly distributed, and towards the end of the sieving process relatively slow axial movements are advantageous, with which the sieved product is evenly distributed without getting lifted from the sieve lining. The movement directions, rotations, movement amplitudes and movement frequencies of the sieve or sieve lining can advantageously be adapted to the needs determined by the user's experience or measurement. Movement sequences can be programmed for all corresponding process phases, which then can be called up and applied in the event of state changes.

Preferably, the functional elements of the sieving device and functional elements of peripheral devices, such as the material dispenser (symbolically shown in FIG. 1 with a downward pointing arrow 9), are coupled together, so that e.g. at the beginning and end of the free fall of the sieved product the sieve can be controlled accordingly.

The inventive sieving device and the operating method therefore allow effectively countering problems occurring during the sieving process. The sieving device can be set from a regular motion sequence to an irregular motion sequence, in which movements are executed by means of which periodically occurring deficiencies or deficiencies detected by sensors, e.g. an inadequate distribution of the sieved product on the sieve lining, are corrected. For example, axial displacements of the sieve can be carried out intermittently in order to achieve an even distribution of the sieved product.

The sieving process can thus be periodically optimized to achieve an increased material throughput. It is also possible to periodically terminate the supply of sieved product and to promote coarse grain, dirt and grain of critical size to the edge of the sieve lining, where it is suck off or eject.

Due to its flexibility the sieving device can be adapted to any sieving process in any configuration. The sieving device can be used in any industry for screening of any process material or sieved product. The sieving device can be easily combined with any material dispenser or conveyor. Material can be delivered or removed through conveyor belts.

It is particularly advantageous that the space required by the sieving device is small and the sieving device also allows providing large openings between the actuators, in which the sieved product can be collected and transported away.

In a particularly preferred configuration, at least one container (see FIG. 6) or at least one conveyor belt (see FIG. 1), in which the sieved material can be collected without loss, is provided between the sieve, the support device and between the actuators.

Particularly, when sieving especially valuable sieved product, the sieve frame can advantageously be equipped with a container that can preferably be inserted or retracted along the longitudinal axis of the sieve frame. Using the actuators, the sieve frame can be moved to a position in which the coupling and decoupling of the container can take place.

The construction of the drive device by means of actuators is particularly simple and advantageous. The number of the actuators (or actuators) is at least three and is selected according to the required movements and accelerations of the sieve. The movements and motion sequences of the sieve are controlled by the operating program, wherefore the design of the sieving device is extremely simple. Due to the simple design of the sieving device, the maintenance effort required is very low. The operating program can be adapted to new applications as required.

The efficiency of the sieving device can be increased and the energy requirement reduced at the same time due to the execution of targeted and particularly effective movements and motion sequences.

Possible are linear, circular, spiral, periodic, and/or harmonic movements. The movements can be uniform or accelerated in order to have a targeted effect on the sieved product or the sieve lining.

In addition, in intervals, targeted interventions into the sieving process are possible, in particular to remove unwanted product particles, including grain of critical size, or to carry out maintenance work.

Due to the possibility of even distribution of the sieved product, simpler sieve designs can be used, in which the sieve lining can also be optimally used peripherally. Particularly advantageous is the use of a rectangular sieve lining.

By means of the inventive sieving device it is now possible to perform currently required corrected motion sequences instead of predefined motion sequences, which are advantageously adapted to the expected or determined state of the sieving device and the sieved product.

One or more sensors are used particularly for determining
a) the state of the present sieved product, in particular the distribution of the sieved product on the sieve lining and the topology of the sieved product lying on the sieve lining with exposed maxima that indicate the presence of grain of critical size, and/or
b) the flow of the sieved product over the entire cross-section of the sieve and the sieve lining, and/or
c) the state of the sieve lining, particularly the local state of the sieve lining and/or the coverage of the sieve lining by the sieved product.

Thereby, different sensors can be used. Especially advantageously applicable are acoustic sensors, especially ultrasonic sensors, optical sensors, especially cameras, infrared sensors and laser sensors, weight sensors, like strain gauges, and capacitive sensors.

By means of optical sensors, the distribution of the sieved product on the sieve lining and the passage of the sieved product through the sieve lining can be advantageously measured at different positions. Optical sensors can be positioned above, below or to the side of the sieve lining so that they can detect the topography of the sieved product resting on the sieve lining and the passage of the sieved product through the sieve lining at different positions.

For example, the sieve lining can be exposed to light on one side, which is detected by light sensors on the other side. Therefore, valuable information can easily be obtained by means of appropriate light barriers. In particular, it can be determined whether the sieved product covers the entire surface of the sieve lining. It is also possible to detect grain of critical size which has got stuck in the sieve lining meshes and causes asymmetries in the topography of the sieved product. If an insufficient distribution, unexpected asymmetries or unexpected maxima within the sieved product are detected, appropriate corrective measures can be taken and appropriate movements of the sieve can be initiated.

Based on the measurement signals or measurement data, the sieving process in the sequence can be advantageously influenced.

With capacitive sensors, minimal changes of the sieve lining, especially strains and deformations of the sieve lining under load, can be detected.

Capacitive sensors are particularly easy to implement since the sieve lining already forms an electrode of a measuring capacitor. The second electrode of the capacitive sensors can each be formed by a metal element, which is preferably rigidly connected to the sieve frame, but isolated from it. The second electrodes can advantageously be designed as rods or plates or perforated sieves, so that they do not hinder the transport of the sieved product.

For measuring a deformation of the sieve lining (the first electrode), for example, a voltage is applied to the two electrodes, which changes depending on the deformation of the first electrode (sieve lining) or the change in the distance between the two electrodes. In this way, minimal deformations of the sieve lining can be measured. Preferably, several measuring capacitors are distributed evenly over the entire surface of the sieve lining. Furthermore, changes can be measured which are caused solely by the sieved product, without the occurrence of deformation of the sieve lining. Locally present sieved product acts as a dielectric, which can also cause voltage changes.

The measurement of a sieve lining loaded with a sieved product or a sieve lining not loaded with a sieved product on the basis of several capacitive sensors uniformly or unevenly distributed on the underside or top of the sieve lining is generally advantageous and can be used advantageously with any sieving device. The sieve frame can be made of metal or plastic. It is essential that the two electrodes are galvanically isolated from each other so that the sieve capacitor can maintain a voltage that is dependent on the distance between the electrodes. As described, the metal sieve lining advantageously forms the first electrode, so that the further measuring capacitors can easily be realized by means of metal elements of any design, which are preferably mounted on the sieve frame at a fixed distance from the sieve lining. Preferably perforated plates or rods are used as second electrodes.

Acoustic sensors, in particular ultrasonic sensors, can also be used to advantage. Different sensors can also be used in combination.

Depending on experience data stored in an electronic memory in the control device and/or under consideration of the change of the measurement signals in time and/or after analysis of the measurement signals provided by the described or further sensors, control signals can therefore be generated, which are forwarded to the drive device or if necessary transmitted to a maintenance device.

By means of these control signals
a) the location, inclination and/or movement of the sieve may be changed in such a way that the distribution and topography of the sieved product is altered as required; and/or
b) the sieve may be subjected to forces, in particular to detach grain of critical size from the sieve lining; and/or
c) the sieve can be moved to a maintenance position, in which e.g. grain of critical size is removed, or to a loading or unloading position, in which e.g. a collection container is removed or inserted; and/or
d) a maintenance element, which is held guidable along the sieve lining, can be activated.

For this purpose it is provided that the sieve can be moved forward and backward in any direction in space and can preferably be rotated at least around one axis, preferably the longitudinal axis or the transverse axis.

The sieve can comprise several sieve components, each with one sieve lining. Preferably several sieve linings are provided, whose mesh widths are gradually reduced.

In preferred embodiments, at least one of the sieve linings or at least one of the sieve frames is connected to a generator which is suitable for emitting mechanical wave movements or vibrations or microwaves by means of which the sieving process is accelerated. It is also possible that the actuators cause the mentioned mechanical waves and effects.

The actuators can be available in any number and in any orientation. The sieve can be held from above by means of the actuators and can thus be suspended or supported from below. Additional actuators can be used to implement additional movements or motion sequences. Furthermore, combinations of actuators can be used, which hold the sieve from above and support it from below.

According to the required movements, joints with the required degree of freedom are also selected. The swivel joints used can be e.g. ball joints, hinge joints, fork joints, angle joints or combinations of these with two joint functions.

The actuators can have a controllable electric drive or can be driven pneumatically or hydraulically.

Below, the invention is explained in more detail with reference to the drawings. Thereby shows.

Figure 1:
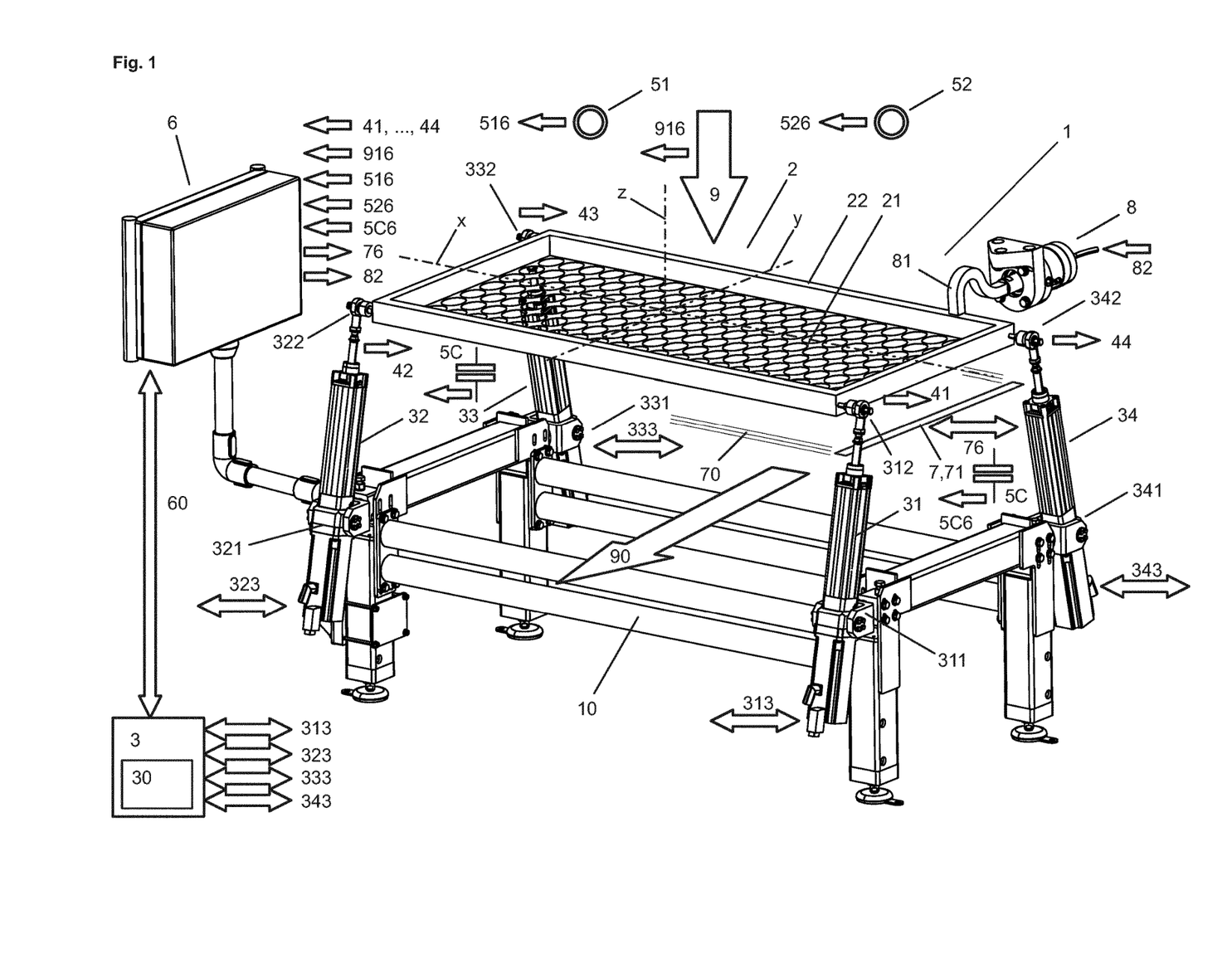
FIG. 1 an inventive sieving device 1 with a sieve 2, which comprises a sieve frame 22, which holds a rectangular sieve lining 22 and which is pivotally connected to four actuators 31, 32, 33, 34, which are pivotally connected to a support device 10 and by means of which the sieve 2 can execute almost any movements within an operating volume, as well as with sensors, in particular optical sensors 51, 52 and/or capacitive sensors 5C and with a maintenance device 7, 71 and a control device 6.

FIG. 1 shows an inventive sieving device 1 in a preferred embodiment with a sieve 2 comprising a sieve frame 22 which holds a rectangular sieve lining 22 and which is connected by joints 312, 322, 332, 342 each with piston rods of four actuators 31, 32, 33, 34 which are connected by joints 311, 321, 331, 341 to a support device 10. The support device 10 comprises four columns connected to the actuators 31, 32, 33, 34, which are connected to each other by cross struts.

The actuators 31, 32, 33, 34 are part of a drive device 3, which additionally includes media lines 313, 323, 333, 343, via which e.g. electrical energy or a hydraulic or pneumatic medium can be transferred from a source 30 to the actuators 31, 32, 33, 34.

For individually controlling the individual actuators 31, 32, 33, 34, the drive device 3 is connected via communication lines, in particular control lines 60 with a control device 6, in which a control computer with an operating program is provided. The operating program is stored in a memory in which operating data and empirical values are preferably also stored, which the operating program can access in order to generate the control signals.

The control device 6 can also receive measurement signals 516, 526, 5C6 from sensors 51, 52, 5C and status signals 916 from a dispenser or conveyor 9, by which the sieved product reaches the sieve lining 21. The sensors 51 and 52 are optical sensors, e.g. imaging sensors, by means of which the state of the sieved product that has reached the sieve lining 21 is monitored. Furthermore, the control device can be connected to temperature sensors and humidity sensors to measure the temperature and humidity of the environment and/or the sieved product.

Especially elegant the state of the sieve lining 21 can be measured by several capacitive sensors 5C, each provided with a measuring capacitor, whose first electrode is formed by the sieve lining 21. The second electrode, such as a metal rod, a metal foil, a metal grid or the like, is preferably arranged at a small distance below or above the sieve lining 21 and is connected to the sieve frame 22 in a stable manner. By means of the electrodes of the measuring capacitor which are not galvanically connected to each other, movements of the sieve lining can be detected advantageously without obstructing the flow of the sieved product.

The maintenance device 7 is shown symbolically and preferably comprises a rod-shaped, spherical or blade-shaped maintenance element 71, which is, mounted in the sieve frame 22 or detached from the sieve frame 22, supported in guide rails 70 slidable along the sieve lining 21 to detach grain of critical size from the sieve lining 21.

Furthermore, from the control device 6 control signals 76, 82 are transmittable to a maintenance device 7 and to a generator, in the present configuration to a microwave generator 8, which is connected to the sieve frame 22 via a coupling rod 81.

Controlled by the control device 6, the sieve 2 can be subjected to almost any movement within an operating volume by means of the actuators 31, 32, 33, 34. The sieve 2 can at least be moved along its longitudinal axis x and/or its transverse axis y and/or rotated around an axis of rotation z that is preferably perpendicular to these axes x, y. The sieve 2 can also be moved along its longitudinal axis x and/or its transverse axis y. These practically unrestricted movements in space as well as the required accelerations can be supported by further actuators. With an equipment of six actuators, a maximum of possibilities can be realized in an economical way. In the present embodiment, the sieve 2 is supported from below by the actuators 31, 32, 33, 34. However, the sieve 2 can also be suspended from the actuators 31, 32, 33, 34. In addition, actuators can also be provided at the bottom and top or laterally. All in all, despite the wide range of possibilities, the material costs are relatively low. It should be noted that the actuators 31, 32, 33, 34 advantageously leave a lot of space open so that larger containers 900 (see FIG. 6) or conveyor belts 90 can be mounted or installed between the support device 10 and the sieve 2 without any problems.

The actuators 31, 32, 33, 34 are preferably linear actuators with a piston rod, which can be driven by an electric motor and extended and retracted step by step. Using the piston rods, the sieve 2 can therefore perform almost any movement within an operating volume. The motion sequences, which are programmable and controlled by the control device 6, depend on the number of actuators used, whose control is coordinated accordingly. The control device 6, which is held by a swivel arm, preferably has a screen or touch screen via which commands can be entered to select pre-programmed motion sequences or to define new motion sequences. The control device 6 can have the resources of a common notebook computer, which is preferably additionally equipped with signal processors, by means of which the incoming measurement signals can be processed practically without delay.

The actuators 31, 32, 33, 34 are preferably connected by ball joints 312, 322, 332, 342; 311, 321, 331, 341 to the sieve frame 22 and the support device 10, which allow the actuators 31, 32, 33, 34 to be rotated to the required extent in any direction without restriction. When extending the piston rod of one of the actuators 31, 32, 33, 34, the other actuators 31, 32, 33, 34 can therefore rotate together as required.

The joints 312, 322, 332, 342; 311 are each preferably connected via a weight sensor 41, 42, 43, 44, e.g. a weight sensor with a strain gauge, to the sieve frame 22, so that the load of the sieve lining 21 and the distribution of the sieved product on which sieve lining 21 can be measured at any time. If, for example, an increased weight is measured by the weight sensors 41 and 44, the piston rods of the actuators 31 and 34 are extended to slide the sieved product parallel to the longitudinal axis x against the weight sensors 42 and 43 until an even weight distribution is obtained. At the same time, vibrations and other movements can have an impact on the sieve 2.

It is therefore possible to overlap different motion sequences upon one another. For example, a first program provides a first motion sequence and a second program a second motion sequence. A third program can combine these two motion sequences and overlap them upon one another.

The programming of the device can be done in different ways. For example, the sieve 2 can be guided along a desired path, whereby the motions of the piston rods of the actuators are measured and registered. Furthermore, curve surfaces can be defined in a geometric space, after which the positions of the first ball joints can be determined and the distances between the corresponding first and second ball joints can be determined. The actuators 31, 32, 33, 34 can also perform oscillating movements to generate vibrations of the sieve lining 21.

Preferably several motion sequences are programmed, so that for each state of the sieving device 1 and/or the sieved product, manually selected or automatically controlled, an appropriate motion sequence can be selected. Preferably a timer is programmed, which automatically triggers program changes, so that e.g. after 100 work cycles a maintenance cycle is inserted, in which a cleaning (removal of rejects) or correction (removal of grain of critical size from the meshes) is carried out. For performing the maintenance cycle, the sieve 2 may be moved to a maintenance position.

By using the weight sensors 41, . . . , 44, it can be determined, for example, that the container 900 is filled and is to be moved to an unloading position.

Figure 2:
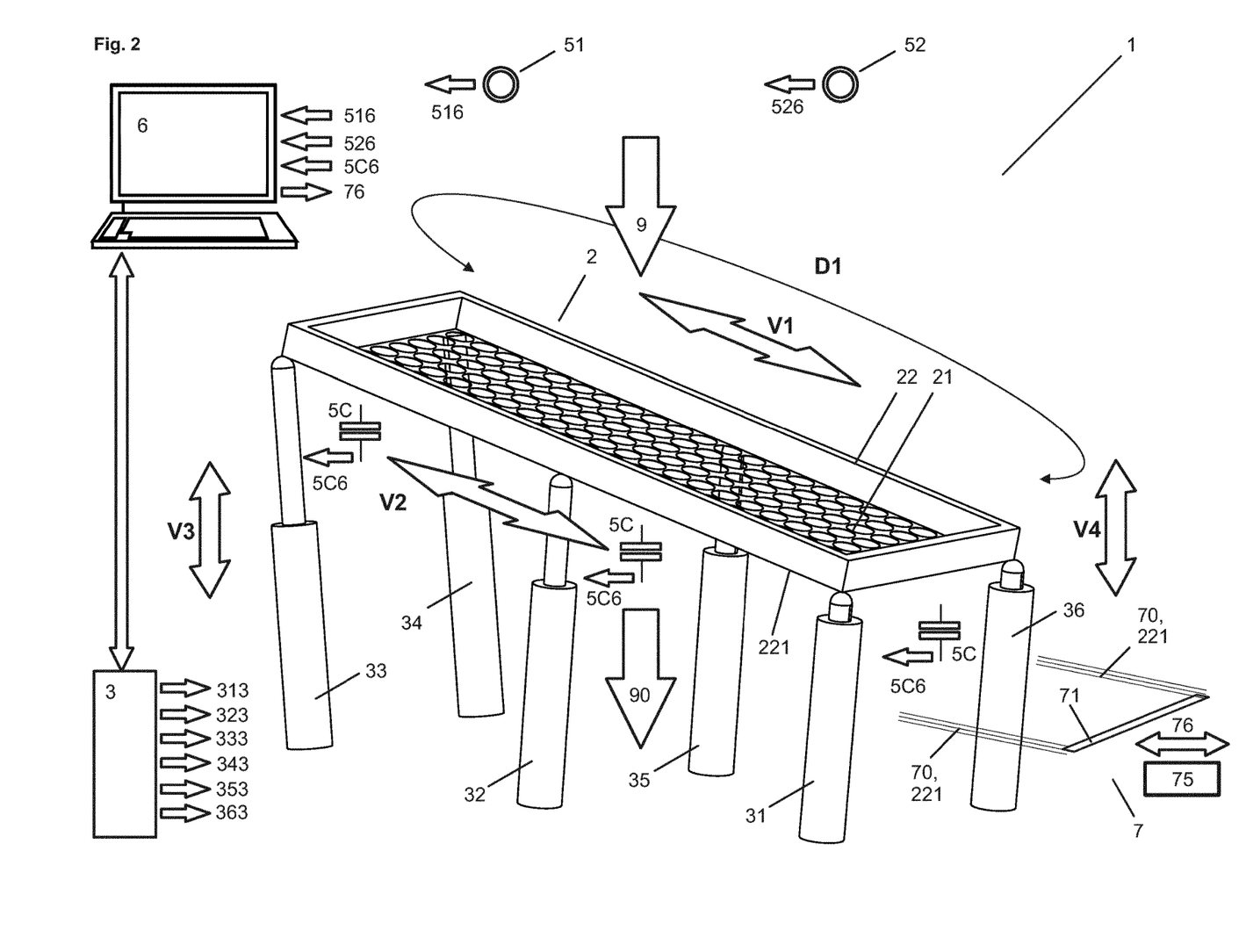
FIG. 2 in symbolic representation the sieving device 1 of FIG. 1 with a sieve 2 held by six actuators 31, 32, 33, 34, 35, 36 by means of which the sieve 2 can perform further movements and can be subjected to additional accelerations.

In this preferred embodiment, the maintenance device 7 comprises a blade-shaped maintenance element 71, which can be moved along guide rails 70, preferably driven by a motor 75 (shown schematically in FIG. 2). For the maintenance operation, the sieve 2 the is displaced on guide rails 70, after which the maintenance element 71 is guided along the sieve lining 21, in particular to loosen grain of critical size.

FIG. 2 shows in symbolic representation the sieving device 1 of FIG. 1 with a sieve 2 held by six actuators 31, 32, 33, 34, 35, 36 by means of which the sieve 2 can perform further movements and can be subjected to additional accelerations.

Figure 3:
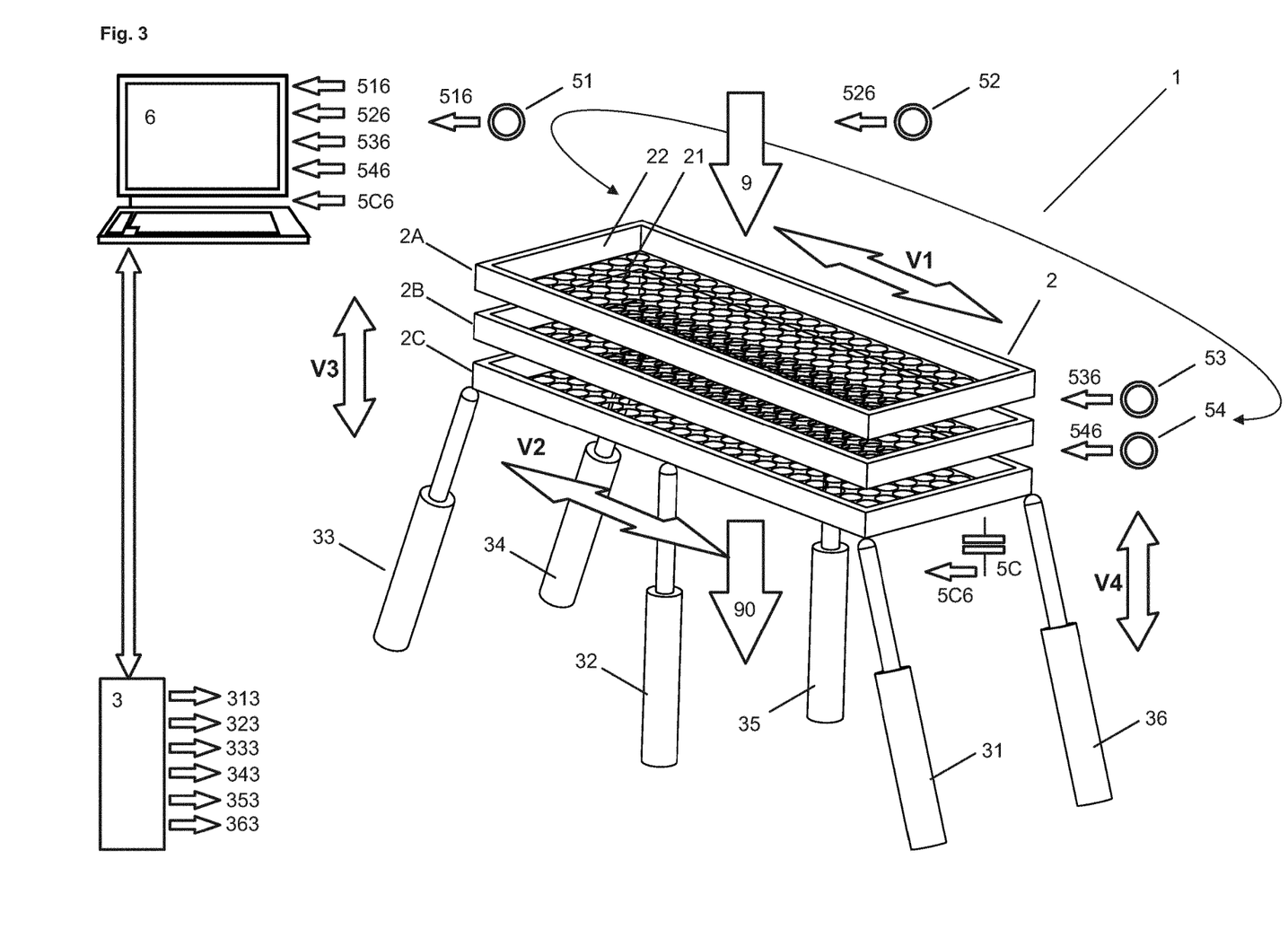
FIG. 3 the sieving device of FIG. 3 with a sieve 2, which comprises three sieve components 2A, 2B, 2C, which each have a sieve frame 22 with a sieve lining 21, to which each preferably at least one monitoring sensor 51, ..., 54; 5C and preferably a maintenance device 7 is assigned.

FIG. 3 shows the sieving device of FIG. 3 with a sieve 2, which comprises three sieve components 2A, 2B, 2C, which each have a sieve frame 22 with a sieve lining 21 and which preferably each have associated at least one monitoring sensor 51, . . . , 54; 5C and preferably a maintenance device 7. The mesh sizes of the sieve linings 21 are reduced from top to bottom so that coarse material can be filtered out in the first two sieve components 2A, 2B and in the third sieve component 2C only material which is slightly larger than grain of critical size. Preferably each sieve component 2A, 2B, 2C, its load with the sieved product, as well as the condition of the sieve lining 21, is individually monitored so that corrective measures can be initiated.

Figure 4:
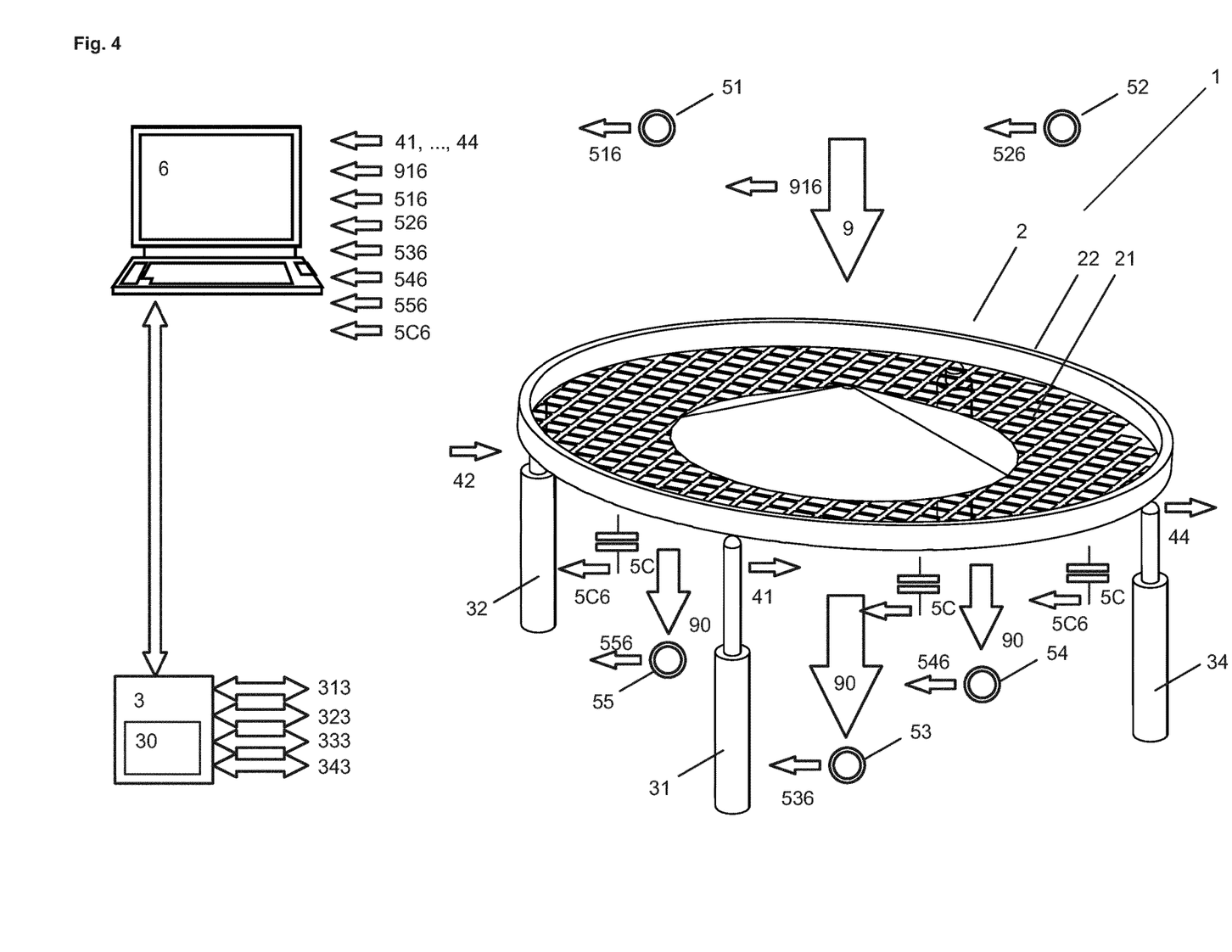
FIG. 4 the sieving device of FIG. 1 with a sieve 2 comprising a round sieve lining 21 covered only in the middle with a sieved product 9.

FIG. 4 shows the sieving device of FIG. 1 with a sieve 2 which has a round sieve lining 21 covered only in the middle with a sieved product 9. By means of the optical sensors 51, 52, which are provided above the sieve lining 21, the topography and the distribution of the sieved product can be measured from above. With the optical sensors 53, 54 and 55, located below the sieve lining 21, the local throughput of the sieved product can be determined and the distribution of the sieved product can be estimated. With capacitive sensors 5C, which are preferably evenly distributed over the sieve 2, local loads of the sieve lining 21 and thus again the distribution of the sieved product can be determined. With the weight sensors 41, 42, 43 and 44, which are arranged between the actuators 31, 32, 33, 34 and the sieve frame 22, the weight of the sieved product and its eccentric arrangement on the sieve lining 21 can be determined.

The sieving device 1 can therefore advantageously be equipped with various sensors, whereby also only individual groups of sensors, optical sensors and/or capacitive sensors and/or acoustic sensors and/or weight sensors can be used on their own or in any combination.

Figure 5:
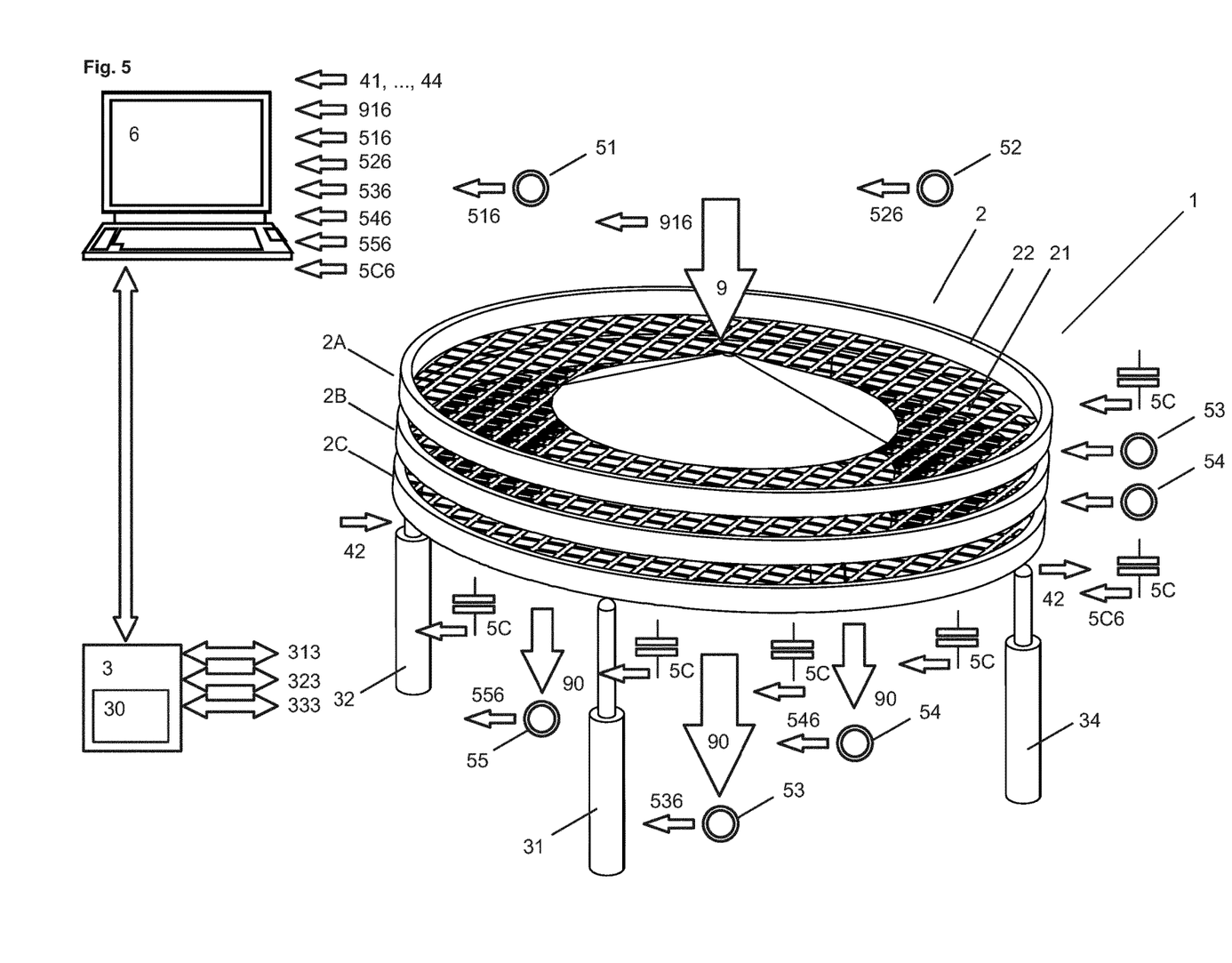
FIG. 5 the sieving device of FIG. 4 with a sieve 2, which comprises three sieve components 2A, 2B, 2C, each having a sieve frame 22 with a sieve lining 21 and preferably each associated with at least one monitoring sensor 51, ..., 54; 5C.

FIG. 5 shows the sieving device of FIG. 4 with a sieve 2, which comprises three sieve components 2A, 2B, 2C, each having a sieve frame 22 with a sieve lining 21 and preferably each with at least one associated monitoring sensor 51, . . . , 54; 5C.

Figure 6:
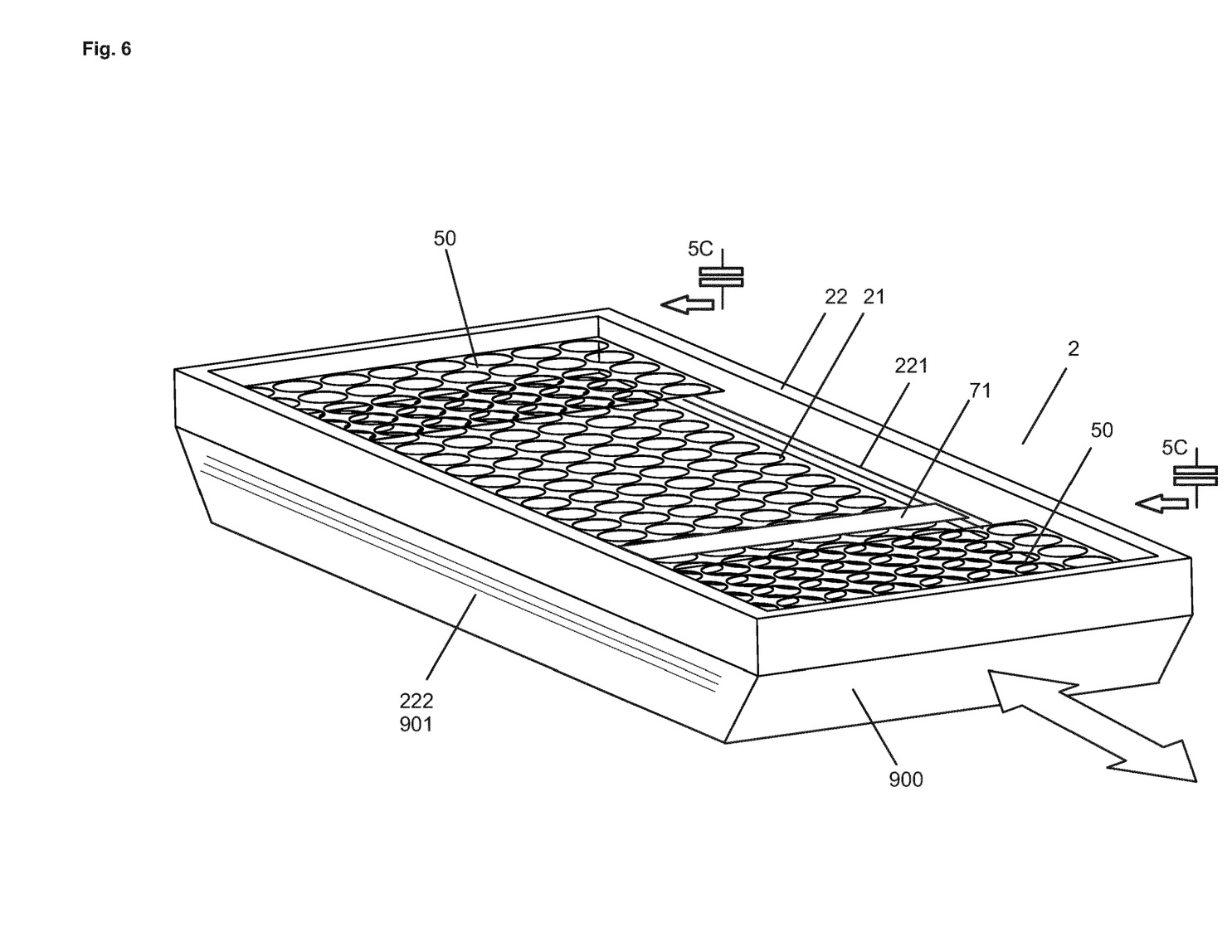
FIG. 6 a sieve 2 in an embodiment with two capacitive sensors 5C and a maintenance element 71, which is displaceably guided in guide channels 221 of the sieve frame 22.

FIG. 6 shows a sieve 2 in a preferred configuration with two capacitive sensors 5C and a maintenance element 71, which is displaceably guided in guide channels 221 within the sieve frame 22.

The sieve frame 22 is also connected to a container 900. The sieve frame 22 preferably has guide rails 222 on the outside, which correspond to guide elements 901 on the inside of the container 900. The container can therefore be pushed onto and removed from the sieve frame 22. This can be done in a simple way by means of the corresponding control of the actuators 31, . . . , 34, . . . , 36, which guide the sieve frame 22 into a corresponding position and push a full container 900 preferably automatically or pick up an empty container 900 preferably automatically by an axial displacement.

The control of the actuators 31, . . . , 34, . . . , 36 can therefore be advantageously integrated into the complete automation of the sieving device 1 and synchronised with adjacent devices of a process line.

The invention claimed is:

1. A sieving device comprising:
a drive device;
a sieve including a sieve frame and at least one sieve lining, the sieve lining being held by the sieve frame, and the sieve frame being connected to the drive device;
a support device, which holds the sieve;
a plurality of first swivel joints; and
a plurality of second swivel joints, wherein
the drive device, which is controllable by a control device by means of a control program, comprises at least three actuators, one end of each actuator being connected to the support device via a first swivel joint of the plurality of first swivel joints, and another end of each actuator being connected to the sieve frame via a second swivel joint of the plurality of second swivel joints, so that the sieve is held solely by the actuators and is displaceable within an operating volume and is optionally rotatable,
the first swivel joints and the second swivel joints include at least one of a ball joint, a hinge joint, a fork joint, or an angle joint, and
the actuators are controllable to perform oscillating movements to generate vibrations of the sieve lining.

2. The sieving device according to claim 1, wherein the sieve is spatially displaceable back and forth and is rotatable at least about its longitudinal axis and/or transverse axis.

3. The sieving device according to claim 1, wherein the sieve comprises a plurality of sieve components, each having a sieve lining.

4. The sieving device according to claim 1, wherein at least one of the sieve linings or at least one of the sieve frames is connected to a generator, which is designed to emit mechanical undulations or microwaves.

5. The sieving device according to claim 1, wherein four, five or six actuators are pivotally connected to sieve and can act from different directions onto the sieve.

6. The sieving device according to claim 1, wherein at least some of the actuators comprise a controllable electric drive and/or that at least some of the actuators are pneumatically driven.

7. The sieving device according to claim 1, wherein at least one sensor is provided, which records measurement signals for the sieved product lying on the sieve lining, and/or that at least one sensor is provided, which records measurement signals for the state of the sieve lining and which transmit the recorded measurement signals to the control device.

8. The sieving device according to claim 7, wherein measurement signals for the sieved product lying on the sieve linings are recordable by at least one optical sensor and/or that measurement signals for the state of the sieve linings are recordable by means of a capacitive or acoustic sensor.

9. The sieving device according to claim 7, wherein the at least one capacitive sensor comprises a measurement capacitor, whose first electrode is the sieve lining and whose second electrode is a metal element, which is held in a constant distance from the sieve lining.

10. The sieving device according to claim 7, wherein the control program is designed for the analysis of the measurement signals and for forming control signals, with which a) the position, inclination and/or movement of the sieve can be changed in such a way that the distribution and topography of the sieved product can be changed; and/or
b) the sieve can be subjected to the action of forces; and/or
c) the sieve is guidable into a maintenance position; and/or
d) a maintenance element which is supported guidable along the sieve lining, can be activated.

11. An operating method for controlling the sieving device according to claim 1.

12. The operating method according to claim 11, wherein measurement signals provided by sensors, which monitor the sieved product lying on the sieve lining and/or the state are forwarded to the control device, which forms control signals, with which
a) the position, inclination and/or movement of the sieve are changed in such a way, that the distribution and topography of the sieved product is changeable; and/or
b) the sieve is subjected to the action of forces; and/or
c) the sieve is guidable into a maintenance position; and/or
d) a maintenance element which is supported guidable along the sieve lining is activated.

* * * * *